United States Patent [19]

Denzin

[11] 4,353,773

[45] Oct. 12, 1982

[54] DEVICE FOR LIFTING LETTER FLAPS

[75] Inventor: Horst Denzin, Berlin, Fed. Rep. of Germany

[73] Assignee: Francotyp GmbH, Berlin, Fed. Rep. of Germany

[21] Appl. No.: 208,320

[22] Filed: Nov. 19, 1980

[30] Foreign Application Priority Data

Nov. 30, 1979 [DE] Fed. Rep. of Germany ....... 2948929

[51] Int. Cl.3 ............................................. B29H 9/00

[52] U.S. Cl. ............................... 156/442.1; 156/442.2

[58] Field of Search ............... 156/441.5, 442.2, 442.3, 156/442.1, 442

[56] References Cited

U.S. PATENT DOCUMENTS 1,799,820 4/1931 Keiser ............................ 156/442.2

2,302,060 11/1942 Ryan .............................. 156/442 X

*Primary Examiner*—David A. Simmons

*Attorney, Agent, or Firm*—Herbert L. Lerner; Laurence A. Greenberg

[57] ABSTRACT

Device for lifting letter flaps for moistening in letter feeding and/or letter sealing machines, including a device for separating letters from a stack having separators and eccentric wheels disposed below the separators, a transport cylinder following the separating device in transport direction of the letters and having a cut formed substantially in the middle thereof, first, second and third pressure rollers disposed above the transport cylinder, the first pressure roller being adjustably insertable into the cut for stiffening letters of different thicknesses by bending them in the longitudinal direction thereof in conjunction with the second and third pressure rollers and for lifting the letter flaps, a common lever arm being adjustable for raising and lowering the separators above the eccentric wheels and for raising and lowering the pressure rollers above the transport cylinder for letters of different thicknesses, and a knob having detent steps formed on the periphery thereof in spiral fashion for adjusting the lever arm.

4 Claims, 2 Drawing Figures

DEVICE FOR LIFTING LETTER FLAPS

Figure 1:
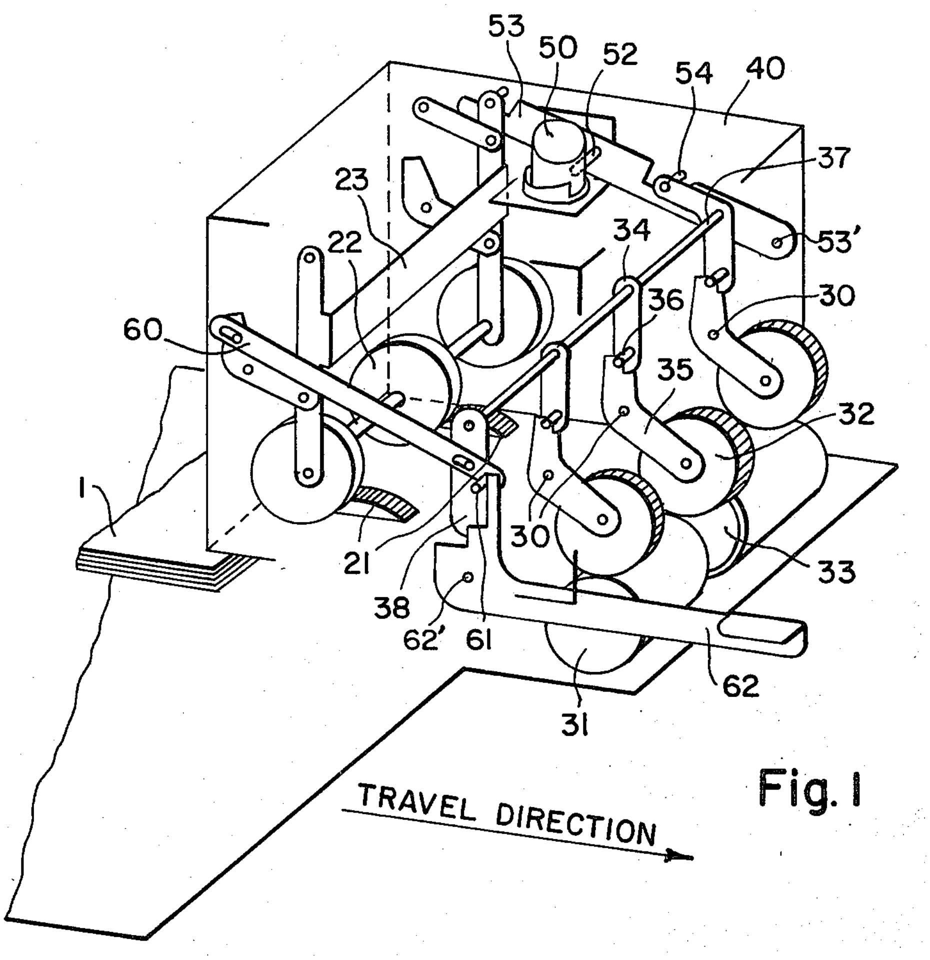

The invention relates to a device for lifting letter flaps for moistening them in letter feeding and letter sealing machines, with an adapting device for different letter thicknesses.

To seal letters, for instance in mail lines prior to franking, it is known to bend the individual letters at the edges, after the letters have been individually drawn from a stack and pushed-on by a conveyer roll by means of a special further feed drive which has curved counter holders. This lifts the letter flap and the letter can be conducted past a separate moistening device.

Another device uses a lateral counter roll which causes the letter flap to arch and thus allows the pushing of a moistening device between the flap and the unsealed letter part during transport to the franking machine.

For the lifting operation of the letter flap, both known devices require additional rolls or cylinders which require space as well as an additional assembly and adjusting effort.

It is accordingly an object of the invention to provide a device for lifting letter flaps which overcomes the hereinafore-mentioned disadvantages of the heretofore-known devices of this general type, and which can be produced more economically, has fewer parts and also operates properly with paper grades of different stiffness and different filling thickness of letter envelopes.

With the foregoing and other objects in view there is provided, in accordance with the invention, a device for lifting letter flaps for moistening in letter feeding and/or letter sealing machines, comprising a device for separating letters from a stack having separators and eccentric wheels disposed below the separators, a transport cylinder following the separating device in transport direction of the letters and having a cut formed substantially in the middle thereof, first, second and third pressure rollers disposed above the transport cylinder, the first pressure roller being adjustably insertable into the cut for stiffening letters of different thicknesses by bending them in the longitudinal direction thereof in conjunction with the second and third pressure rollers and for lifting the letter flaps, a common lever arm being adjustable for raising and lowering the separators above the eccentric wheels and for raising and lowering the pressure rollers above the transport cylinder for letters of different thickness, and a knob having detent steps formed on the periphery thereof in spiral fashion for adjusting the lever arm.

In accordance with another feature of the invention, there is provided a support lever attached to the first pressure roller, and an adjusting pin cooperating with the support lever for adjusting depth of insertion of the first pressure roller into the cut formed in the transport cylinder.

In accordance with a further feature of the invention, there is provided a rod being disposed parallel to the lever arm and attached to the separators and pressure rollers, and an operating element being movable into contact with the rod for fast manual adjustment of the separators and pressure rollers.

In accordance with a concomitant feature of the invention, the operating element includes means for holding down letters leaving the transport cylinder.

Other features which are considered as characteristic for the invention are set forth in the appended claims.

Although the invention is illustrated and described herein as embodied in a device for lifting letter flaps, it is nevertheless not intended to be limited to the details shown, since various modifications and structural changes may be made therein without departing from the spirit of the invention and within the scope and range of equivalents of the claims.

Figure 2:
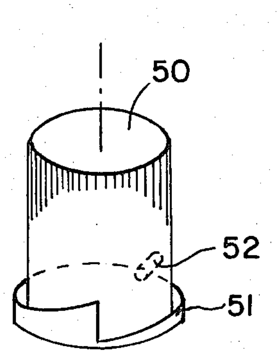

The construction and method of operation of the invention, however, together with additional objects and advantages thereof will be best understood from the following description of specific embodiments when read in connection with the accompanying drawings, in which:

FIG. 1 is a diagrammatic, frangmentary perspective view of a device for separating letters and lifting the letter flaps; and FIG. 2 is a diagrammatic perspective view of an adjusting knob for adaptation to the thickness of the letter envelopes.

Referring now to FIGS. 1 and 2 of the drawing as a whole, it is seen that the letters 1 sitting on a stack are drawn individually from the stack by a separating device. This separating device, including eccentric wheels 21 and three separators 22, is followed by a transport cylinder 31. Opposite the transport cylinder 31, which serves to pass-on the individual letters, are three pressure rollers. The pressure rollers are pressed against the transport cylinder 31 by non-illustrated springs. The transport cylinder 31 is provided at the middle thereof with a cut 33 which is disposed opposite the middle pressure roller 32. Fulcrums 30 of the support levers of the three pressure rollers are situated along a common line, but the insertion depth of the middle pressure roller 32 is adjustable. To this end, a lever 34 acts on the support lever 35 of the middle pressure roller 32, is provided with a setting pin 36 being adjustable in height relative to the lever 34, in a slot formed in the lever. If a letter 1 is passed through, it is bent about its longitudinal axis, which gives it more stiffness. In addition, the letter flap facing the cut 33 of the transport cylinder 31 is lifted off the letter envelope by the bending of the envelope. The letter is then brought through a non-illustrated separating plate to a following moistening device, the letter and the letter flap being separated by the separating plate. Suitable moistening devices for the letter flap are disposed on the underside of the separating plate.

The support levers of the pressure rollers are connected to a height adjustment by the levers which are fastened on a common shaft 37. This height adjustment includes a fulcrumed lever arm 53 pivoted in the side wall 40 at point 53', and a knob 50 with detent steps 51 distributed about its circumference in spiral fashion. The outer lever on the shaft 37 is provided with a pin 54 which lies in a recess formed in the lever arm 53. By turning the knob 50, the lever arm 53 is moved by a pin 52, and in turn raises or lowers the pressure rollers by moving the pin 54 of the outer lever of the shaft 37 which moves the shaft 37, the actuating levers 38, the pins 36 and the support levers 35.

The support bracket 23 of the separators 22 is raised or lowered by the same lever arm 53, so that adaptation to different filling thicknesses of the letters is possible.

A rod 60 which is disposed opposite the lever arm 53 is connected to the support bracket 23 and to an actuating lever 38 of the shaft 37. A pin 61 of the rod 60 is acted upon by an angular operating element 62 when it is pivoted upwardly about the side wall 40 at a point 62', through which a fast manual adjustment of the separator 22 and the pressure rollers is possible. The operating element 62 further serves for holding down the letters when they leave the transport cylinder 31.

In summary, the invention provides a device for lifting letter flaps for the purpose of moistening, in letter feeding and letter sealing machines through a special shape of the transport cylinder and the arrangement of pressure rollers, without additional parts. By arranging the separators of the separating device and the pressure rollers of the transport cylinder on a common lever arm, a height adjustment for different letter thicknesses is provided.

There are claimed:

1. Device for lifting letter flaps for moistening in letter feeding and/or letter sealing machines, comprising a device for separating letters from a stack having separators and eccentric wheels disposed below said separators, a transport cylinder following said separating device in transport direction of the letters and having a cut formed substantially in the middle thereof, first, second and third pressure rollers disposed above said transport cylinder, said first pressure roller being adjustably insertable into said cut for stiffening letters of different thicknesses by bending them in the longitudinal direction thereof in conjunction with said second and third pressure rollers and for lifting the letter flaps, a common lever arm being adjustable for raising and lowering said separators above said eccentric wheels and for raising and lowering said pressure rollers above said transport cylinder for letters of different thicknesses, and a knob having detent steps formed on the periphery thereof in spiral fashion for adjusting said lever arm.

2. Device according to claim 1, including a support lever attached to said first pressure roller, and an adjusting pin cooperating with said support lever for adjusting depth of insertion of said first pressure roller into said cut formed in said transport cylinder.

3. Device according to claim 1, including a rod being disposed parallel to said lever arm and attached to said separators and pressure rollers, and an operating element being movable into contact with said rod for fast manual adjustment of said separators and pressure rollers.

4. Device according to claim 3, wherein said operating element also serves for holding down letters leaving said transport cylinder.

* * * * *